Oct. 13, 1959   R. D. RIVERS ET AL   2,908,348
ELECTROSTATIC AIR FILTER
Filed Nov. 18, 1957   2 Sheets-Sheet 1
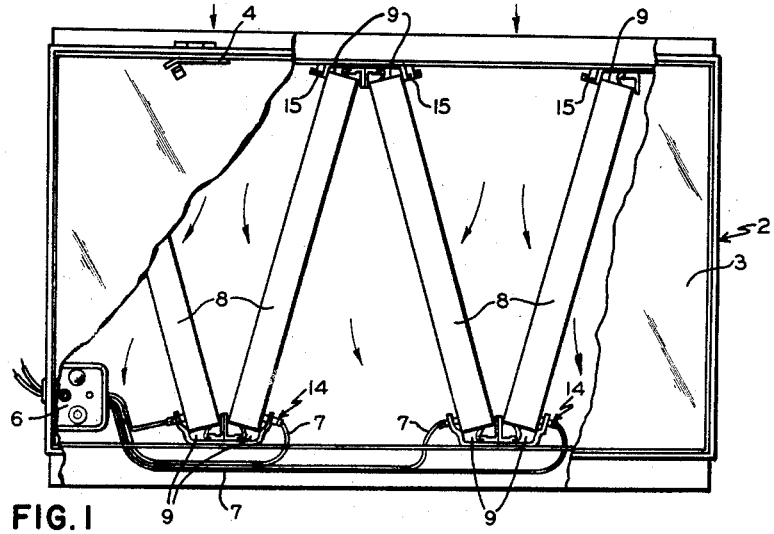
FIG. I
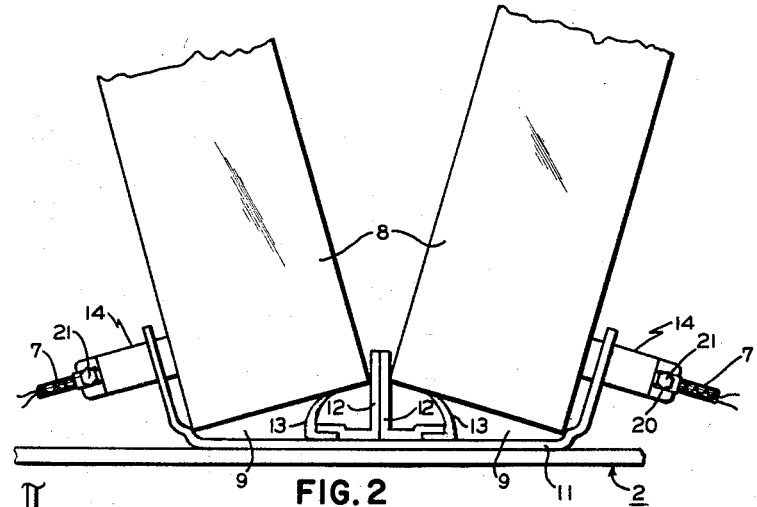
FIG. 2
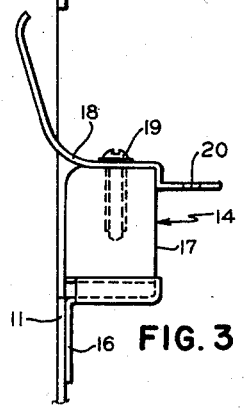
FIG. 3
INVENTORS
RICHARD D. RIVERS
& DELOSS H. ROBB
BY *Ralph B. Brick*
ATTORNEY

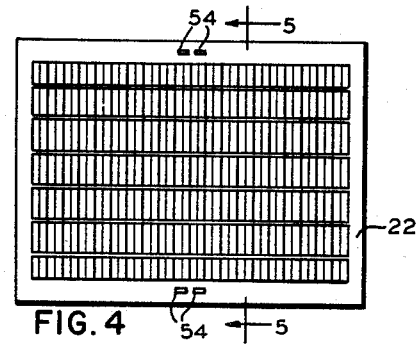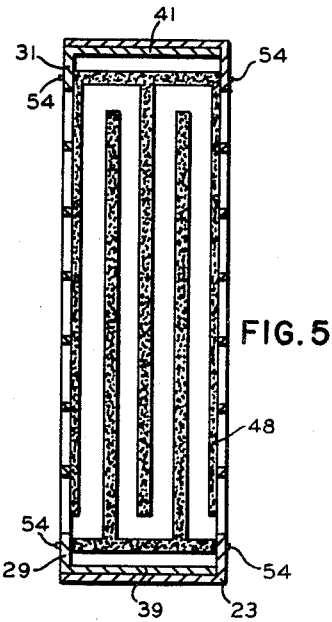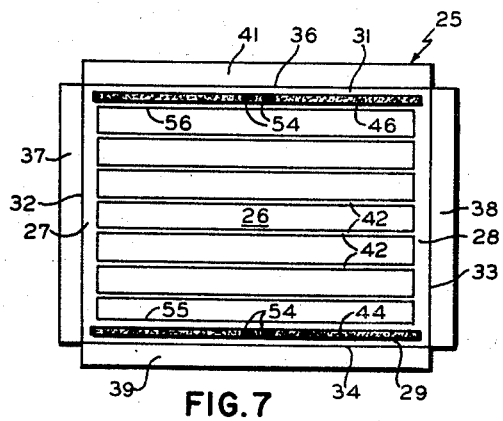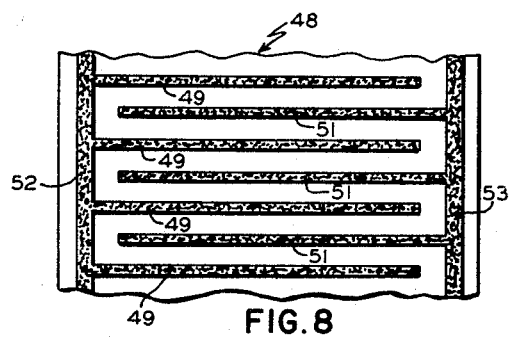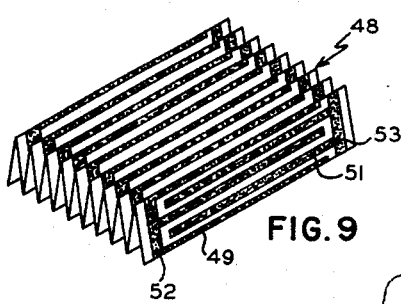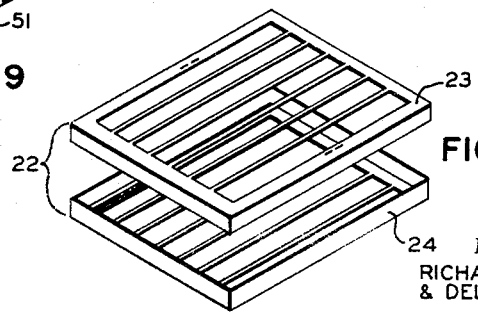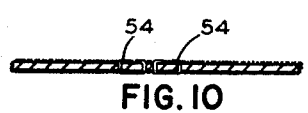

United States Patent Office 2,908,348
Patented Oct. 13, 1959

2,908,348

ELECTROSTATIC AIR FILTER

Richard D. Rivers and Deloss H. Robb, Louisville, Ky., assignors to American Air Filter Company, Inc., Louisville, Ky., a corporation of Delaware Application November 18, 1957, Serial No. 697,107

9 Claims. (Cl. 183—7)

The present invention relates to air filters and more particularly to electrostatic air filters of the type employing an electrostatically charged web of porous air permeable dielectric material disposed across the path of an air stream for removing dust particles therefrom.

The present invention comprises a further improvement over the inventive air filter structure set forth in assignee's co-pending application, Serial No. 553,858, filed December 19, 1955, now Patent 2,868,319 dated January 13, 1959, applicant Richard D. Rivers. In this co-pending application, filter cell structure is disclosed as including a web of porous air permeable dielectrical material provided with a condenser-like series of spaced conductive stripes of opposite electrical sign, the stripes being electrically connected within the filter cell itself either to electrical terminals on the end walls of the perimetric frame of the cell or to electrical terminal-receiving areas thereon.

One of the features of the present invention is to provide a modified electrical terminal arrangement which permits an effective contact of the terminals of the cell with the electrical connections leading to the conductive stripes on the web and yet which lends itself to rapid assembly in the mass production of such type cells. Another feature of the present invention is to provide an electrical connection arrangement between the terminals and the web of the cell which can accommodate high impressed voltages without incurring accompanying problems of grounding. Still another feature of the present invention is to provide a filter cell electrical terminal arrangement which effectively cooperates with the electrical contacts in the housing in which the cell is mounted but which permits an uninterrupted air seal between the cell and the wall of such housing. In addition, the present invention provides a compact and unitary filter cell and housing arrangement which permits rapid and accurate installation of the cell within the housing, at the same time assuring an effective electrical connection throughout the overall filter arrangement.

Various other features of the present invention will become obvious to one skilled in the art upon reading the disclosure set forth hereinafter.

More particularly, the present invention provides an electrostatic air filter comprising: a cell housing having spaced opposed guide channels mounted on the inner walls thereof; a power pack disposed within the housing; an electrostatic air filter cell having an open faced perimetric frame of dielectric material slidably disposed between the spaced offset guide channels transverse to the direction of air flow; a web of air pervious dielectric air filter material extending across the interior of the frame; a series of uniformly spaced electrically-conductive stripes of alternating electrical signs on the web; an electrical terminal on the frame including a metallic staple member passing through a wall of the frame; an electrical connection extending within the frame between the metallic staple member and the stripes of one electrical sign on the web to electrically connect the staple to the stripes, the electrical connection including a conductive coating along the face of the web and spaced from the marginal edge of the web; yieldable electrical contact means electrically connected to the power pack and disposed within the cell housing to positively engage the metallic staple member; and continuous seal members between the guide channels and the perimetric frame to form air seals therebetween.

It is to be understood that various changes can be made in the arrangement, shape and construction of the structure set forth hereinafter without departing from the scope or spirit of this invention.

Referring to the drawings, which disclose one advantageous embodiment of the present invention:

Figure 1 is a partially broken away, vertical sectional view of the cell housing, disclosing the cells mounted therein;

Figure 2 is an enlarged view of a portion of the cell housing and cell arrangement, including details of the guide channel arrangement;

Figure 3 is an enlarged plan view of a yieldable electrical contact member disclosed in Figure 2;

Figure 4 is a face or elevational view of a corrugated filter cell constructed in accordance with the present invention, this cell containing a corrugated web;

Figure 5 is a section taken in a plane passing through line 5—5 Figure 4;

Figure 6 is a perspective view of the frame of the filter cell of Figures 4 and 5, prior to assembly, disclosing the telescoping shells which form the frame;

Figure 7 is a plan view of one of the blanks from which a shell of the frame is formed;

Figure 8 is a developed plan view of the dielectric web used in the cell of Figures 4 and 5;

Figure 9 is a perspective view of the corrugated web;

Figure 10 is an enlarged fragmentary, sectional view taken through a side wall terminal of the frame.

Referring to Figure 1 of the drawings, the inventive electrostatic air filter is disclosed as including a cell housing 2 having an access door 3 fastened to one end thereof by means of latch members 4. In this figure of the drawings, door 3 is partially broken away to disclose a portion of the interior of the housing and, as can be seen, a power pack supply unit 6 for supplying power to electrostatic filter cells is mounted on one side wall thereof. The installation of the power pack unit 6 within the housing serves to increase the overall compactness and safety of the unit and to eliminate many of the electrical connections which would otherwise be required if the power pack were to be mounted on the outside of the housing.

Extending from power pack unit 6 within the housing are a series of cables 7, one cable being provided for each of a plurality of spaced filtered cells 8 which are mounted in the cell housing. Although not disclosed, it is to be understood that a separate limiting resistor can be provided with each cable 7 so that, in the event of breakdown of one cell, the other cells in the housing can continue to operate. As can be seen in Figures 1 and 2, each filter cell 8 has is perimetric frame portion slidably disposed between spaced opposed and offset guide channels 9 so as to rest within the housing in a plane inclined to the horizontal and transverse to the direction of air flow. In this connection, it is to be noted that power pack unit 6 and the electrical connections 7 to the electrostatic filter cell 8 are so positioned as to be on the clean air side of the cell housing to thus maintain the pack and such connections free from undesirable and current interrupting dust particles. Further, the slidable arrangement of each of the cells between the spaced opposed and offset channels 9 permits rapid and accurate installation and removal of each cell in the event such an operation is required.

Referring particularly to Figure 2, it can be seen that guide channels 9 are formed from channel members 11 which are of substantially U-shaped cross section and which are fastened to the inner walls of the cell housing 2 to extend longitudinally therealong (not shown). Each channel member 11 is divided into adjacent guide channels by means of a pair of right angle members 12 which are mounted in back-to-back relationship and which extend within the channel members 11 between the side wall portions thereof. It is to be noted that one leg of each of the right angle members 12 is of offset contour in order to engage with and to retain between itself and the base of channel member 11 an elastic seal member 13. With such an arrangement, each elastic seal members 13 extends along the length of the guide channel 9 in which it is positioned to serve as a continuous air seal between the cell housing 2 and the horizontally extending end wall of the frame of cell 8 mounted in the guide channel. It is to be understood, in this connection, that the inner face of door 3 of housing 2 and the inner face of the housing wall opposite thereto can be provided with suitable fibrous sealing media to form a seal between the vertically extending walls of the filter cell 8 and the cell housing.

Fastened to each of the opposite side walls of each longitudinally extending channel member 11 on the clean air side of housing 2 is an electric contact member 14; and fastened to each of the opposite side walls of each longitudinally extending channel member 11 on the dirty side of housing 2 is an electric contact member 15. Each contact member 14 on the clean air side of the housing is connected to one of the cables 7 extending from the power pack supply unit 6 and each contact member 15 on the dirty side of the housing is connected to ground. As can be seen in Figure 3 of the drawings, each contact member 14 includes an insulator clip holding portion 16 which is welded to a wall of channel member 11, an insulator 17 supported by the holder portion 16, and a yieldable spring contact 18 fastened to one end of the insulator by means of a tap screw 19. The spring contact 18 has an eye 20 therein to which the end of one of cables 7 is connected by means of a lug or rivet 21. Although not disclosed in detail, it is to be understood that, since each of contact members 15 is connected to ground, the insulator holding portion and insulator are not included as part of these members.

Referring to Figures 4, 6 and 7 of the drawings, it can be seen that each filter cell 8 is constructed to include an open face perimetric frame member 22. This frame member 22 is so constructed as to included two box-like shells 23 and 24 which are of substantially similar design and contour but one of which is of slightly smaller dimension than the other so that it can be telescoped into the larger to form the perimetric frame 22 (Figures 4 and 6). Referring particularly to Figure 7, a blank 25 is disclosed from which one of the two substantially identical telescoped shells is made. The blank, which can conventionally be comprised of cardboard or any other suitable material, advantageously electrically non-conductive, includes a main panel portion 26 formed by opposite sides 27, 28 and 29, 31 so as to provide an open face of the shell when it is set-up from the blank. Extending from each of sides 27, 28, 29 and 31 along score lines 32, 33, 34 and 36 respectively are side panels 37, 38, 39 and 41 respectively. When the shell is set up these side panels form the side walls thereof and when such shell is telescoped with another shell (Figure 6) they cooperate with the side walls of such other shell to form reinforced end walls for the perimetric frame 2 (Figure 5). It is to be noted that the blank 25 is provided with spaced support ribs 42 which extend between opposite sides 27 and 28 of the main panel parallel to the opposite sides 29 and 31. As will be seen more fully hereinafter, these support ribs serve to support a web member 48 which is disposed in the perimetric frame 22. It also is to be noted that the opposite sides 29, 31 of the main panel are provided with electrically conductive bus strips 44, 46 respectively, these bus stripes extending the length of their respective sides and being so positioned as to be spaced from the score lines 34, 36 respectively and cardboard edges 55, 56 respectively.

Referring to Figures 5, 8 and 9, the web 48 is disclosed, the web being of such contour as to be mountable in the perimetric frame 22. Web 48 can be composed of air pervious dielectric air filter material and advantageously is disposed within frame 22 to extend across the interior thereof in corrugated fashion from one side perimetric wall of the frame to the other with its opposed edges abutting the opposed end walls formed by side panels 39, 41 of telescoping blanks. The web can be composed of any suitable air permeable dielectric material of economic nature, such as paper, cloth or glass in felted or woven form; and, advantageously, it can be composed of glass fibers which are felted, woven or otherwise bounded together.

Referring particularly to Figure 8, it can be seen that web 48 contains a condenser-like spaced conductive stripe arrangement comprising: alternate stripes 49 of one electrical sign and intermediate stripes 51 of opposite electrical sign. As set forth in the aforementioned copending application, these stripes can be sprayed, silk screened or printed on the web, printing being considered the most advantageous operation to use because of the simplicity and the rapidity with which it can be performed. The conductive coating can be one of a number of suitable materials which have an aluminum, silver or graphite base. Conductive graphitic paints and inks are considered advantageous because they are readily available and easy to apply. Colloidal graphite suspended in water or in an organic solvent has very good conductivity and good adhesion.

While various arrangements of stripes can be employed, as can be seen in the co-pending application, the pattern shown particularly in Figure 8 comprises straight, parallel conductive cross stripes extending as straight lines, transversely across the web with alternate stripes 49 extending from a bus stripe 52 which runs parallel to and is spaced from the edge of web 48 and intermediate stripes 51 extending from a bus stripe 53 which runs parallel to and is spaced from the opposite edge of web 48. In this connection, it is to be noted that bus strips 52 and 53 are spaced from the edges of web 48 to properly mate with bus stripes 44 and 46 respectively when web 48 is mounted in frame 22 and to avoid problems of grounding in the event of high impressed voltages. It is further to be noted that alternate and intermediate strips 49 and 51 extend from each of their respective bus stripes 52 and 53 to a distance just short of the opposite bus stripe to avoid short circuiting.

As aforestated, one of the features of the present invention is to provide filter cell terminals which insure adequate electrical contact and which can be assembled rapidly and effectively to the frame of the filter cell. Referring to Figures 7 and 10 of the drawings, it can be seen that the terminals are in the form of metal staples 54 which are stapled or fastened into the sides 29, 31 of main panel 26 of blank 25 to be in opposed open faces of perimetric frame 22 when it is set up. Although only two spaced metal staples are shown in each of sides 29, 31 of the open face main panel, it is to be understood that the number of these staples in sides 29, 31 can be varied in accordance with the results desired. It further is to be understood that the staples can be inserted by any one of a number of conventional and well known stapling machines which can do the stapling quickly and effectively. In inserting each staple 54, it is important that it engage one of the conductive bus stripes 44 or 46 painted along the sides 29, 31 respectively. As aforementioned, these conductive bus stripes 44, 46 are spaced from the score lines 34, 36 and edges 55, 56 respectively so as to engage with the bus stripes 52, 53 painted on web 48 in spaced relationship from the web edges. With such an arrangement, not only is it possible to obtain effective contact between staples 54 on frame 22 and bus stripes 52, 53 on web 48 but it also is possible to impress high voltages on the terminals or staples 54 without incurring problems of grounding which might otherwise arise if the electrically conductive portions were adjacent cell housing 2. It further is possible with such an arrangement to provide effective sealing between each filter cell 8 and cell housing 2 since seal members 13 can engage in a continuous and uninterrupted fashion with the end walls of the cell formed by sides 39, 41 of blank 25, avoiding the interruption which might otherwise occur if the terminals are positioned in these end walls.

In assembling filter cells 8 into cell housing 2, it only is necessary to remove access door 3 on one side of the housing and slide the cells between the offset and opposing guide channels 9. When this is done, metal staples 54 are positively engaged by yieldable spring contacts 18 of contact members 14 and 15 to assure effective electrical connection between each filter cell 8 and power pack 6 on the clean air side of housing 2. Thus, the filter cells can be installed in a rapid, straight forward and effective manner in a minimum of time and with a minimum of effort.

The invention claimed is:

1. An electrostatic air filter comprising: a cell housing having spaced opposed guide channels mounted on the inner walls thereof; an electrostatic air filter cell having an open faced perimetric frame portion slidably disposed along and between said spaced opposed guide channels transverse to the direction of air flow, said frame portion of said cell having electrical terminal means disposed thereon; yieldable electrical contact means fixed within said housing to positively engage said electrical terminal means on said perimetric frame portion of said cell when said perimetric frame portion is slid between said guide channels; and continuous yieldable seal members between said guide channels and said perimetric frame portion to form uninterrupted air seals therebetween.

2. An electrostatic air filter comprising: a cell housing having spaced opposed guide channels mounted on the inner walls thereof; a power pack disposed within said housing; an electrostatic air filter cell having an open faced perimetric frame portion slidably disposed along and between said spaced guide channels transverse to the direction of air flow, said frame portion of said cell having electrical terminal means disposed on the sides thereof; yieldable electrical contact means electrically connected to said power pack and mounted on said guide channels to positively engage said electrical terminal means on said frame portion of said cell when said perimetric frame portion is slid between said guide channels; and continuous yieldable seal members between said guide channels and the end walls of said perimetric frame portion to form uninterrupted air seals therebetween.

3. The structure of claim 2, said power pack yieldable electrical contact means being positioned in said housing so as to be on the downstream side of said air filter cell.

4. An electrostatic air filter comprising: a cell housing having spaced opposed guide channels mounted on the inner walls thereof; an electrostatic air filter cell having an open faced perimetric frame of dielectric material slidably disposed between said spaced opposed guide channels transverse to the direction of air flow; a web of air pervious dielectric air filter material extending across the interior of said frame; a series of uniformly spaced electrically conductive stripes of alternating electrical signs on said web; an electrical terminal on said frame including a metallic staple member passing through a face of said frame; an electrical connection extending within said frame between said metallic staple member and the stripes of one electrical sign on said web to electrically connect said staple to said stripes; yieldable electrical contact means disposed within said cell housing to engage said metallic staple member; and continuous seal members between said guide channels and said perimetric frame to form air seals therebetween.

5. The structure of claim 4, said electrical connection between said staple member and said stripes including a conductive coating along the face of said web and spaced from the marginal edge of said web.

6. An electrostatic air filter cell comprising: an open faced perimetric frame; a web of air pervious dielectric air filter material extending across the interior of said frame to clean air electrically when electrostatically charged and mechanically when charged and uncharged; and means for distributing an electrostatic charge over said web, said distributing means including a series of spaced electrically conductive stripes of alternating electrical signs on a face of said web, an electrical terminal area on said frame and an electrical connection extending within said frame from stripes of one electrical sign on the web to said area on said frame, said connection including a conductive coating along the face of said web connecting with the adjacent ends of at least two of said transversely extending stripes of said one electrical sign, said conductive coating on said web face being spaced from the marginal edge of said web.

7. An electrostatic air filter cell comprising: an open faced perimetric frame; a web of air pervious dielectric air filter material extending across the interior of said frame to clean air electrically when electrostatically charged and mechanically when charged and uncharged; and means for distributing an electrostatic charge over said web, said distributing means including a series of spaced electrically conductive stripes of alternating electrical signs on a face of said web, a first electrical terminal area on said frame and a first electrical connection extending within said frame from stripes of one electrical sign on the web to said first area on said frames, a second electrical terminal area on said frame and a second electrical connection extending within said frame from stripes of the other electrical sign on the web to said second area on said frame, said first and second electrical connections each including a conductive coating along the face of said web connecting the adjacent ends of stripes of like sign, said conductive coatings on said web face being spaced from the marginal edges of said web.

8. An electrostatic air filter cell comprising: an open faced perimetric frame of dielectric material; a web of air pervious dielectric air filter material extending across the interior of said frame; a series of uniformly spaced electrically-conductive stripes of alternating electrical signs on said web; an electrical terminal on said frame including a metallic staple member passing through a face of said frame; and an electrical connection extending within said frame between said metallic staple member and the stripes of one electrical sign on said web to electrically connect said staple to said stripes.

9. An electrostatic air filter cell comprising: an open faced perimetric frame of dielectric material the border of said frame having a U-shaped cross section; a web of air pervious dielectric air filter material extending across the interior of said frame within said border; a series of uniformly spaced electrically-conductive stripes of alternating electrical signs on said web; an electrical terminal on said frame including a metallic staple member passing through a side of said U-shaped border; and an electrical connection extending within said frame between said metallic staple member and the stripes of one electrical sign on said web to electrically connect said staple to said stripes, said connection including a conductive coating along the face of said web spaced from the adjacent marginal edge of said web and connecting with adjacent ends of stripes having the same electrical sign.

References Cited in the file of this patent

UNITED STATES PATENTS

| | | |
|---|---|---|
| 2,650,672 | Barr | Sept. 1, 1953 |
| 2,729,302 | True | Jan. 3, 1956 |

FOREIGN PATENTS

| | | |
|---|---|---|
| 1,109,084 | France | Sept. 21, 1955 |